United States Patent
Morse et al.

(10) Patent No.: US 9,797,461 B2
(45) Date of Patent: Oct. 24, 2017

(54) REMOVABLE BRAKE COVER

(71) Applicant: Cadillac Products Automotive Company, Troy, MI (US)

(72) Inventors: Kevin E. Morse, Lake Orion, MI (US); Robert J. Zander, Troy, MI (US); Michael P. Williams, II, Bloomfield Hills, MI (US)

(73) Assignee: Cadillac Products Automotive Company, Troy, MI (US)

( * ) Notice: Subject to any disclaimer, the term of this patent is extended or adjusted under 35 U.S.C. 154(b) by 147 days.

(21) Appl. No.: 14/811,121

(22) Filed: Jul. 28, 2015

(65) Prior Publication Data
US 2016/0025162 A1 Jan. 28, 2016

Related U.S. Application Data

(60) Provisional application No. 62/029,765, filed on Jul. 28, 2014.

(51) Int. Cl.
*F16D 65/00* (2006.01)
*F16D 55/00* (2006.01)

(52) U.S. Cl.
CPC .. *F16D 65/0081* (2013.01); *F16D 2055/0037* (2013.01)

(58) Field of Classification Search
CPC ..... F16D 2055/0033; F16D 2055/0037; F16D 65/0031; F16D 65/0081
See application file for complete search history.

(56) References Cited

U.S. PATENT DOCUMENTS

| 4,253,552 A | | 3/1981 | Shibatani et al. | |
| 4,257,498 A | * | 3/1981 | Nogami | F16D 55/22 188/218 A |
| 4,817,765 A | * | 4/1989 | Turak | F16D 51/00 188/218 A |

FOREIGN PATENT DOCUMENTS

| DE | 202014102912 U1 * | 12/2014 | ......... F16D 65/0081 |
| JP | 2011-051096 A | 3/2011 | |

(Continued)

OTHER PUBLICATIONS

International Search Report and Written Opinion of The International Searching Authority for PCT/US2015/042468 dated Oct. 30, 2015.

*Primary Examiner* — Anna Momper
(74) *Attorney, Agent, or Firm* — Harness, Dickey & Pierce, P.L.C.

(57) ABSTRACT

A removable brake cover apparatus is disclosed including a sidewall presenting frontal and posterior surfaces and a circumferential wall extending transversely from the sidewall to define a brake rotor receiving cavity adjacent the posterior surface of the sidewall. A brake caliper pocket having a limited circumferential extent is disposed along the sidewall and the circumferential wall to define a brake caliper receiving cavity adjacent the brake rotor receiving cavity. Engagement fingers extend radially into the brake caliper receiving cavity to engage a brake caliper received therein with an audible and/or tactile indicator defining a fully installed position of the brake cover apparatus. Locking recesses extend radially into the brake rotor receiving cavity to engage a brake dust shield received therein. Multiple ones of the brake cover apparatus disclosed are nestable with one another in a stacked arrangement wherein the engagement fingers and locking recesses perform locating and anti-rotation functions.

20 Claims, 10 Drawing Sheets

(56) References Cited

FOREIGN PATENT DOCUMENTS

| KR | 10-2011-0026888 A | 3/2011 |
| KR | 1020110134784 A | 12/2011 |
| WO | 2008-004977 A1 | 1/2008 |

\* cited by examiner

REMOVABLE BRAKE COVER

CROSS REFERENCE TO RELATED APPLICATIONS

This application claims the benefit of U.S. Provisional Application No. 62/029,765, filed Jul. 28, 2014. The entire disclosure of the above application is incorporated herein by reference.

FIELD

The subject disclosure generally relates to removable brake covers, which may be installed over a brake system to protect it from environmental exposure.

BACKGROUND

This section provides background information related to the present disclosure which is not necessarily prior art.

Brake systems, such as those found on vehicles, generally include a brake rotor and a brake caliper. The brake rotor rotates with a wheel of the vehicle and the brake caliper is fixed in place relative to the brake rotor. When the brake system is applied, the brake caliper squeezes the brake rotor to slow rotation of the brake rotor and thus the wheel. The brake rotor and the brake caliper are often formed of materials that become fouled over time as a result of environmental exposure. For example, metals are often extensively used to form these brake system components and exposure of the metal to water can lead to corrosion (i.e. rust). Further still, dirt, dust, smoke, and other foreign materials can foul the brake system. Environmental exposure often occurs when the vehicle is being transported by truck, rail, or vessel. Since new vehicles are often transported to the consumer over long distances, there is a need to protect the brake system from environmental fouling prior to delivery to the consumer.

Removable brake covers have been developed to temporarily cover the brake system of a vehicle during transport. For example, U.S. Pat. No. 4,253,552 entitled "Anti-Rust Cover For A Disc Rotor Of A Vehicle Disc Brake," which names Shibatani et al. as the inventors, discloses one such removable brake cover that generally includes a convex sidewall configured to engage the brake dust shield of a brake system. A radially extending slit is also disclosed that extends across the convex sidewall to facilitate removal of the brake cover by tearing. However, in this design, only the brake rotor is covered by the brake cover and the brake caliper is left exposed. Another removable brake cover is disclosed in WO 2008/004977 entitled "Protecting Cover For Temporarily Protective Shielding Parts Of A Brake System At A Vehicle Wheel," which names Pihl as the inventor. This publication teaches a brake cover including a disc-shaped sidewall and a circumferential wall that extends perpendicularly from the sidewall. A brake caliper pocket is formed in the sidewall and the circumferential wall such that both the brake rotor and the brake caliper are covered by the brake cover. Again, a slit or tear-line is provided such that the brake cover can be torn away from the brake system to remove the brake cover.

While these known brake covers perform their intended purpose of protecting the brake rotor and/or brake caliper from becoming fouled as a result of environmental exposure, there are several drawbacks to these designs. First, these brake covers are retained by the brake dust shield only, leaving a large portion of the brake cover free of attachment to the brake system. This is particularly true where the brake caliper is large, such as where the brake caliper houses many pistons or "pots." With the ever increasing performance limits of tires and chassis, such large brake calipers are becoming increasingly popular. Accordingly, conventional attachment points that are limited to the brake dust shield make such known brake covers more susceptible to coming loose during transportation. Second, the retention performance of brake covers depends on proper installation. Installer error can cause the brake cover to come loose during transportation, resulting in exposure of the brake system to the environmental. A loose brake cover can also result in damage to the brake system and/or the vehicle should the loose brake cover become jammed in the wheel and/or brake system when the vehicle is being driven. Third, the brake covers disclosed in the aforementioned references are bulky and are not easily handled or shipped in large numbers. Accordingly, there is a need for an improved brake cover that addresses the drawbacks associated with conventional brake covers.

SUMMARY

This section provides a general summary of the disclosure, and is not a comprehensive disclosure of its full scope or all of its features.

The subject disclosure provides for a removable brake cover apparatus generally comprising a sidewall and a circumferential wall. The sidewall presents a frontal surface and a posterior surface that is opposite the frontal surface. The circumferential wall extends transversely from the sidewall to define a brake rotor receiving cavity adjacent the posterior surface of the sidewall. The circumferential wall presents an inner surface bounding the brake rotor receiving cavity and an outer surface that is opposite the inner surface. A brake caliper pocket is disposed along the sidewall and the circumferential wall. The brake caliper pocket has a limited circumferential extent and projects from the frontal surface of the sidewall to define a brake caliper receiving cavity adjacent the brake rotor receiving cavity. The brake cover apparatus includes at least one engagement finger that projecting radially inwardly from the inner surface of the circumferential wall at the brake caliper pocket. Accordingly, the at least one engagement finger extends into the brake caliper receiving cavity. The at least one engagement finger is thus configured to engage a brake caliper received within the brake caliper receiving cavity when the brake cover apparatus is moved to a fully installed position.

In accordance with another aspect of the subject disclosure, the brake cover apparatus may additionally include at least one locking recess that projects radially inward from the inner surface of the circumferential wall. The at least one locking recess generally includes a locking ramp that extends into the brake rotor receiving cavity to engage a brake dust shield received within the brake rotor receiving cavity.

In accordance with yet another aspect of the subject disclosure, the brake cover apparatus is configured such that multiple ones of the brake cover apparatus are nestable (e.g. stackable). During stacking of multiple brake cover apparatuses, at least one locking recess of one brake cover apparatus nests with at least one locking recess of an adjacent brake cover apparatus to resist relative movement between the multiple brake cover apparatuses.

Thus, the disclosed brake cover apparatus realizes several advantages over conventional brake covers. The disclosed brake cover apparatus attaches to the brake caliper via the at least one engagement finger and to the brake dust shield via the at least one locking recess to provide multiple attachment points to the brake system. This provides improved retention of the brake cover apparatus over known designs, which only attach to the brake dust shield. Accordingly, the disclosed brake cover apparatus is better suited for use with today's vehicles, which generally feature larger brake calipers having several pistons. The disclosed brake cover apparatus also reduces the likelihood of the brake cover coming loose as a result of installer error. The at least one engagement finger may be configured to engage the brake caliper with a snap as the brake caliper is received in the brake caliper receiving cavity, providing an audible and/or tactile indicator that the brake cover apparatus is fully installed. This feature provides positive feedback to the installer that the brake cover apparatus has been properly installed over the brake system making the installation process easier for the installer, while at the same time reducing the likelihood of installer error. Finally, the disclosed brake cover apparatus has many nesting features, including those that are built into the at least one engagement finger and the at least one locking recess, which allow multiple brake cover apparatuses to be stacked together neatly and at a pre-determined spacing. Advantageously, such a stack of multiple brake cover apparatuses occupies less space and allows a large number of brake cover apparatuses to be moved together as a single unit.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
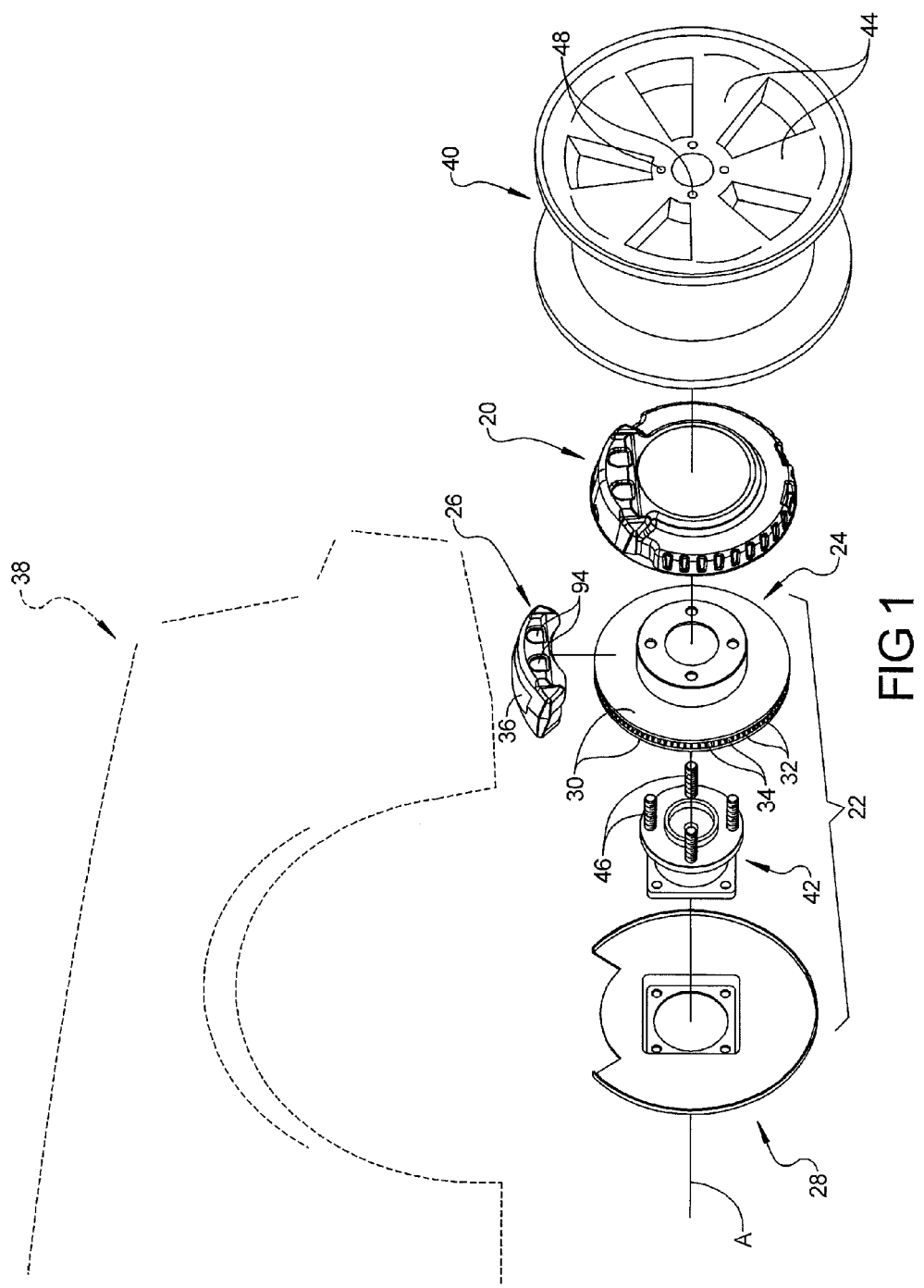
FIG. 1 is an exploded perspective view of an exemplary brake system and an exemplary brake cover apparatus constructed in accordance with the subject disclosure.

Referring to the Figures, wherein like numerals indicate corresponding parts throughout the several views, a brake cover apparatus 20 for protecting a brake system 22 is disclosed. As is known in the art, such a brake system 22 may include, without limitation, a brake rotor 24, a brake caliper 26, and a brake dust shield 28.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, the brake cover apparatus 20 may be installed over the brake system 22 including over the brake rotor 24, the brake caliper 26, and the brake dust shield 28. As is known in the art, the brake rotor 24 generally has a disc-like shape that is concentrically aligned with a longitudinal axis A. It should be appreciated that in use, the brake rotor 24 rotates about this longitudinal axis A. While many different configurations are known, the brake rotor 24 may include two parallel circular plates 30 that are longitudinally spaced by rotor vanes 32. According to this arrangement, the rotor vanes 32 provide structural support between the two parallel circular plates 30 with cooling channels 34 disposed between adjacent rotor vanes 32 and the two parallel circular plates 30. In this way, air may flow through the brake rotor 24 for enhanced cooling. The two parallel circular plates 30 may additionally be cross-drilled with holes and/or slots for increased air flow and thus improved cooling. The brake caliper 26 is generally disposed on either side of a portion of the brake rotor 24 such that the brake caliper 26 extends over portions of the two parallel circular plates 30 in an overlapping relationship. Thus, a gap 36 maybe defined by the brake caliper 26 adjacent to and radially outward of the brake rotor 24. The brake caliper 26 is radially spaced from and fixed in relation to the longitudinal axis A. Brake pads (not shown) may be installed within the brake caliper 26, which function to press against the brake rotor 24 from opposing sides to effectively clamp the brake rotor 24 when the brake system 22 is applied. The brake dust shield 28 may be at least partially disc shaped and is generally disposed adjacent the brake rotor 24. When the brake system 22 is installed on a vehicle 38, the brake dust shield 28 is oriented between the brake rotor 24 and the vehicle 38. In other words, the brake dust shield 28 appears to be behind the brake rotor 24 when viewing the brake system 22 from outside the vehicle 38 along the longitudinal axis A. The vehicle 38 may have one or more wheels 40 that are rotatably coupled to the brake rotor 24 via a hub 42. Although there are a wide range of wheel designs, the wheels 40 may feature multiple spokes 44 such that portions of the brake system 22 may be seen through the space between adjacent spokes 44. The hub 42 may extend into or through the brake rotor 24 along the longitudinal axis A. The hub 42 may also present a plurality of wheel studs 46 that mate with mounting holes 48 in each wheel 40.

The brake cover apparatus 20 may be installed over the brake caliper 26 and the brake rotor 24. Accordingly, the brake cover apparatus 20 covers at least a portion of the brake caliper 26 and at least a portion of the brake rotor 24. More specifically, the brake cover apparatus 20 covers one side of the brake rotor 24 while the brake dust shield 28 may cover at least part of the other side of the brake rotor 24. Stated another way, in a fully installed state, the longitudinal arrangement of parts proceeds as follows starting from the outside and working towards the vehicle 38: the brake cover apparatus 20, followed by the brake rotor 24, followed by the brake dust shield 28. The brake cover apparatus 20 is removable from the brake system 22 and provides the brake system 22 with temporary protection from the environment. Such protection may be particularly desirable when new vehicles 38 are being shipped via truck, rail, or vessel, where the brake system 22 may become fouled as a result of being exposed to water, dust, dirt, smoke, and other foreign matter.

Figure 2:
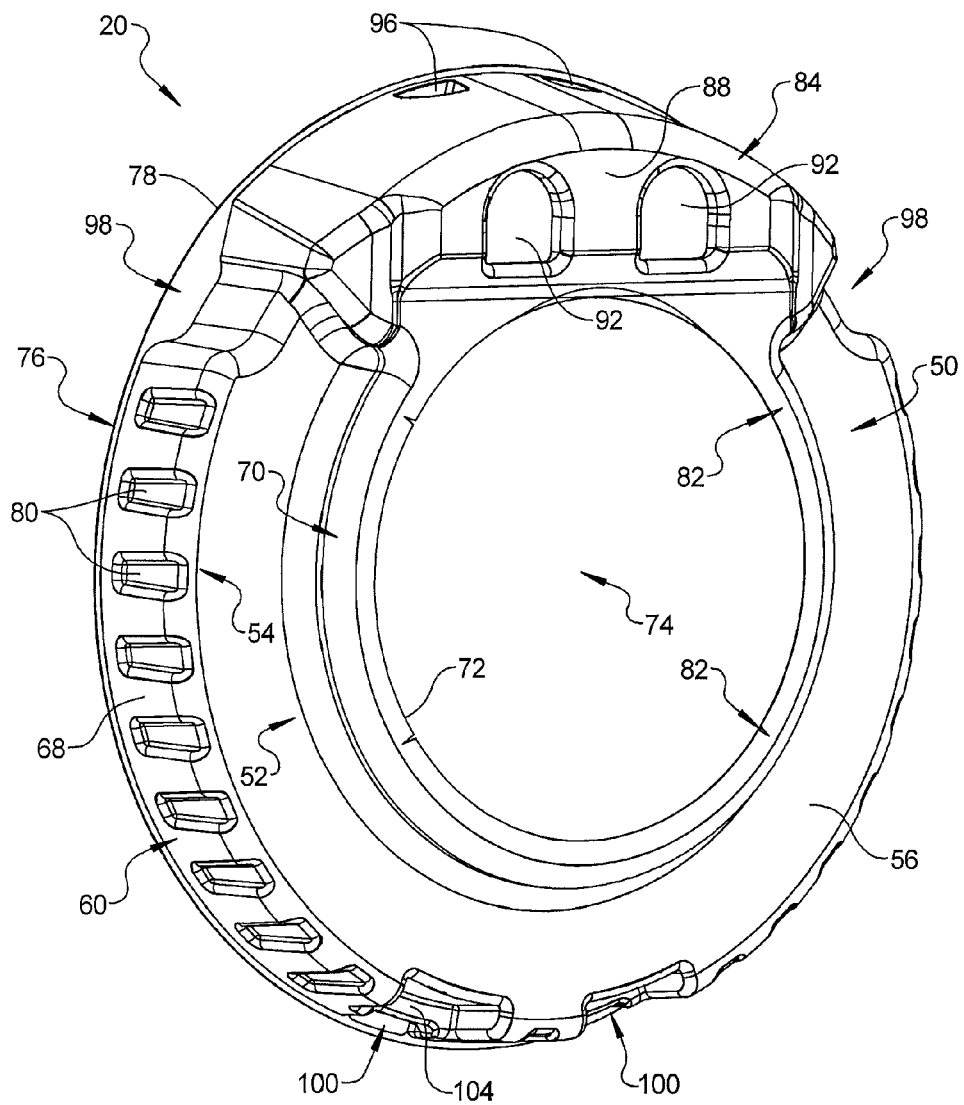
FIG. 2 is a front perspective view of the exemplary brake cover apparatus shown in FIG. 1.
Figure 3:
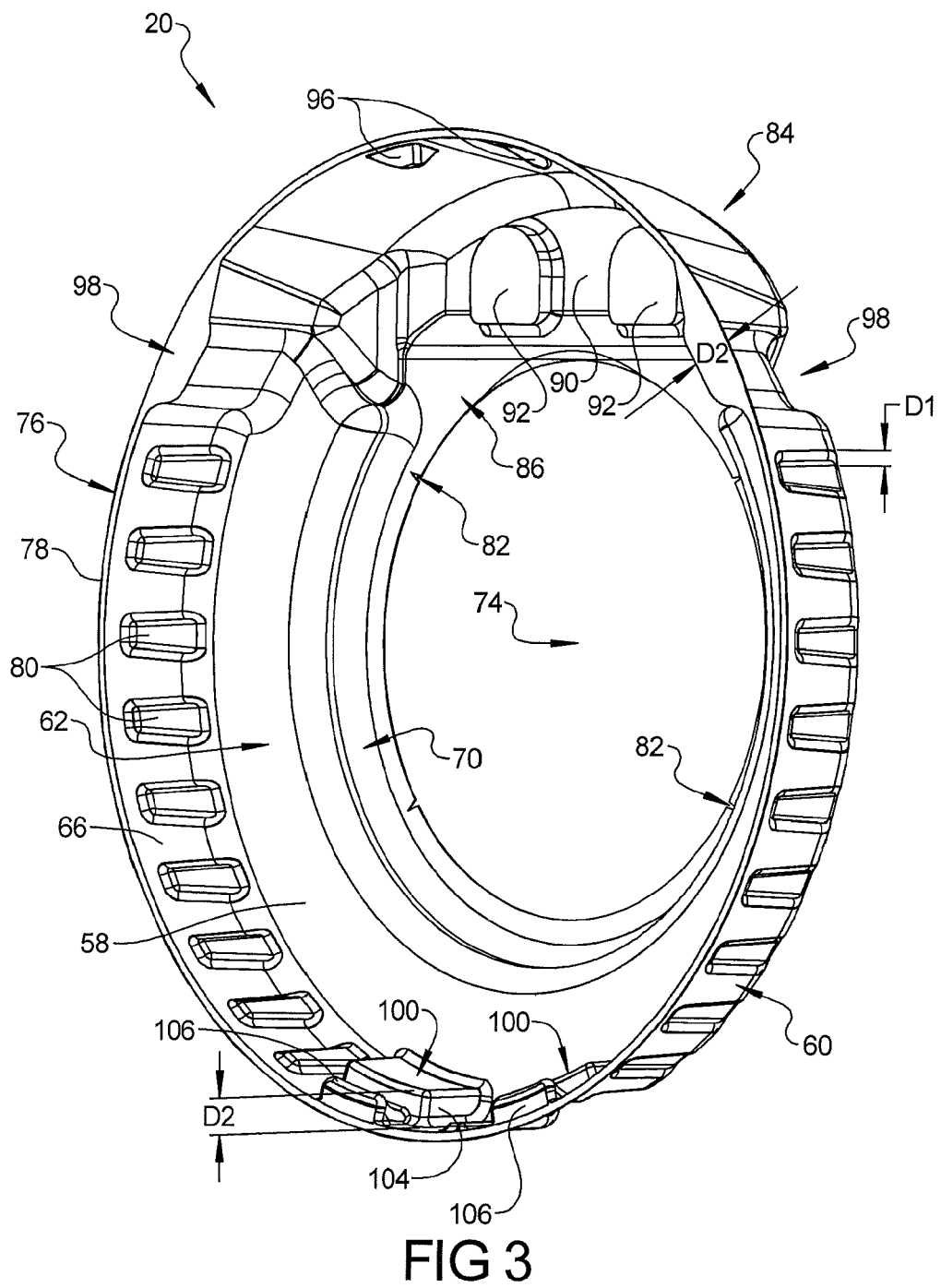
FIG. 3 is a rear perspective view of the exemplary brake cover apparatus shown in FIG. 1.
Figure 4:
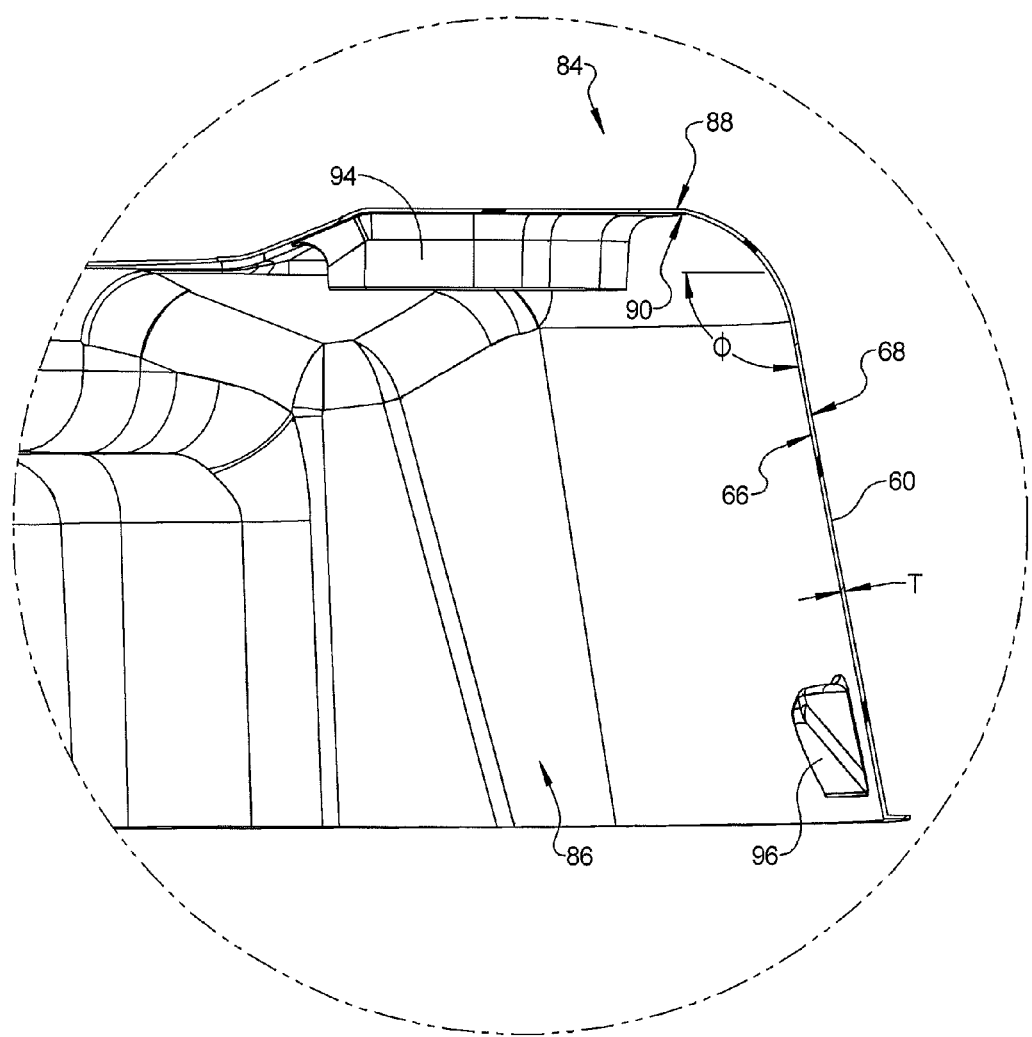
FIG. 4 is a side cross-sectional view of the brake caliper pocket of the exemplary brake cover apparatus shown in FIG. 1.

With additional reference to FIGS. 2-4, the brake cover apparatus 20 includes a sidewall 50. The sidewall 50 may take several forms. For example, the sidewall 50 may generally have a circular, disc-like shape and the sidewall 50 may be flat, generally convex, concave, or curved. The sidewall 50 extends radially with respect to the longitudinal axis A between an inner edge 52 and an outer edge 54. The outer edge 54 of the sidewall 50 is concentrically aligned with and radially spaced from the inner edge 52. Accordingly, the outer edge 54 of the sidewall 50 is radially outward of the inner edge 52 of the sidewall 50. As used herein, the term "radially" refers to a direction generally extending toward and away from the longitudinal axis A. However, it should be appreciated that a "radially" extending element need not be perfectly aligned with a plane that is perpendicular to the longitudinal axis A. It should also be appreciated that the inner edge 52 and the outer edge 54 of the sidewall 50 generally describe a region of the sidewall 50 and do not necessarily correspond to a discontinuity, junction, or end in the material forming the brake cover apparatus 20. The sidewall 50 also presents a frontal surface 56 and a posterior surface 58. The posterior surface 58, as defined by the sidewall 50, is opposite the frontal surface 56.

The brake cover apparatus 20 also includes a circumferential wall 60. The circumferential wall 60 may generally have a cylindrical shape and extends transversely from the outer edge 54 of the sidewall 50 to define a brake rotor receiving cavity 62 adjacent the posterior surface 58 of the sidewall 50. As used herein, the term "transversely" means that the circumferential wall 60 is oriented at an angle φ with respect to the sidewall 50 such that the circumferential wall 60 and the sidewall 50 intersect. Therefore, the circumferential wall 60 may, or may not, be perpendicular to the sidewall 50. Advantageously, the circumferential wall 60 may be oriented at an angle φ that is greater than ninety degrees with respect to the sidewall 50 to facilitate the nesting (e.g. stacking) of multiple ones of the brake cover apparatus 20. Accordingly, multiple brake cover apparatuses 20 may nest or stack with one another to reduce the height of such a stack 64 (see FIG. 8). The circumferential wall 60 also presents an inner surface 66 and an outer surface 68 that is opposite the inner surface 66. The inner surface 66 of the circumferential wall 60 circumferentially bounds the brake rotor receiving cavity 62. When the brake cover apparatus 20 is installed over the brake system 22, at least a portion of the brake rotor 24 is received by the brake rotor receiving cavity 62 and is thus at least partially circumscribed by the inner surface 66 of the circumferential wall 60.

Still referring to FIG. 1 and additionally to FIGS. 2-4, an annular projection 70 extends longitudinally from the frontal surface 56 of the sidewall 50. As used herein, the term "longitudinally" generally refers to a direction moving toward or away from the sidewall 50 of the brake cover apparatus 20, which generally corresponds to movement along the longitudinal axis A. However, it should be appreciated that a "longitudinally" extending element need not be extending in a direction that is exactly parallel to the longitudinal axis A. It should further be appreciated that a "longitudinally" extending element may generally be described as moving toward or way from the vehicle 38. Thus, a "longitudinally" extending element may, or may not, extend perpendicularly with respect to the radially extending sidewall 50. The annular projection 70 also extends radially inwardly from the inner edge 52 of the sidewall 50 to form an innermost edge 72. The innermost edge 72 of the annular projection 70 defines a central opening 74. While the central opening 74 may have a variety of different shapes, the central opening 74 may have, for example, a circular shape. The central opening 74 may accommodate the hub 42 and/or wheel studs 46 that are connected to the brake rotor 24. Accordingly, the hub 42 and/or wheel 40 studs 46 may extend through the central opening 74 when the brake cover apparatus 20 is installed over the brake system 22. The brake cover apparatus 20 may also include an outer lip 76 extending radially outwardly from the circumferential wall 60 to form an outermost edge 78. The outer lip 76 is therefore longitudinally spaced from the sidewall 50 by the circumferential wall 60 and the outermost edge 78 circumscribes the outer lip 76. Accordingly, the brake cover apparatus 20 generally extends between the innermost edge 72 of the annular projection 70 and the outermost edge 78 of the outer lip 76, with the inner edge 52 and the outer edge 54 of the sidewall 50 generally delimiting a region of the brake cover apparatus 20.

The brake cover apparatus 20 may also include a plurality of ribs 80 circumferentially spaced about the circumferential wall 60. Each rib 80 of the plurality of ribs 80 projects radially inwardly from the inner surface 66 of the circumferential wall 60 at a first depth D1. The plurality of ribs 80 increases the structural rigidity of the circumferential wall 60. Each rib 80 of the plurality of ribs 80 may be tapered, narrowing in the longitudinal direction, as the rib 80 extends longitudinally toward the outer lip 76. Thus, the plurality of ribs 80 help to align nested brake cover apparatuses 20 during nesting (e.g. stacking) because the ribs 80 of adjacent brake cover apparatuses 20 nest with each other during nesting (e.g. stacking). A plurality of tear elements 82 may also be provided in the annular projection 70. The plurality of tear elements 82 allow the brake cover apparatus 20 to be removed by tearing. To remove the brake cover apparatus 20, a person simply reaches in between the spokes 44 of the wheel 40 and tears along the tear elements 82. Accordingly, the brake cover apparatus 20 is torn into several pieces that can be pulled away from the brake system 22 and through the space between the spokes 44 of the wheel 40. Thus, the brake cover apparatus 20 can be removed in a quick and easy manner without having to remove any wheels 40 from the vehicle 38. The tear elements 82 may be constructed in a variety of different ways, including without limitation, as slits, notches, indentations, perforations, and/or cuts. In FIGS. 2 and 3, the tear elements 82 are illustrated as notches that are circumferentially spaced about the innermost edge 72 of the annular projection 70.

The material the brake cover apparatus 20 is made from and the thickness T of the brake cover apparatus 20 must be selected for ease of tearing while maintaining sufficient rigidity and strength to positively engage and be retained on the brake caliper 26 and brake dust shield 28. While many suitable materials may exist, the brake cover apparatus 20 may be made of high impact polystyrene (i.e. HIPS) or polyvinylchloride (PVC) for example. Accordingly, the brake cover apparatus 20 may be made of a material that is clear, opaque, or translucent depending on the material chosen and whether any dies or paint is applied to the brake cover apparatus 20. The range of possible thicknesses T of the brake cover apparatus 20 varies with the chosen material. When using high impact polystyrene (i.e. HIPS) or polyvinylchloride (PVC), a thickness T in the range of 0.014 inches to 0.025 inches, and preferably 0.018 inches, has been found to be a suitable.

As best seen in FIG. 4, the brake cover apparatus 20 includes a brake caliper pocket 84 disposed along the sidewall 50 and the circumferential wall 60. The brake caliper pocket 84 has a limited circumferential extent such that it generally conforms to a semi-circular shape. The brake caliper pocket 84 projects longitudinally from the frontal surface 56 of the sidewall 50 to define a brake caliper receiving cavity 86 adjacent the brake rotor receiving cavity 62 (FIG. 3). The brake caliper pocket 84 presents a front surface 88 and a back surface 90 that generally correspond with the frontal surface 56 and the posterior surface 58 of the sidewall 50 (FIGS. 2 and 3) respectively. The back surface 90 of the brake caliper pocket 84 bounds the brake caliper receiving cavity 86 and is opposite from the front surface 88. When the brake cover apparatus 20 is installed over the brake system 22, at least a portion of the brake caliper 26 is received by the brake caliper receiving cavity 86. A pair of depressions 92 project longitudinally from the back surface 90 of the brake caliper pocket 84 into the brake caliper receiving cavity 86. The pair of depressions 92 generally mate with like-shaped contours 94 of the brake caliper 26. Accordingly, the pair of depressions 92 resists rotation of the brake cover apparatus 20 with respect to the brake caliper 26. Each depression 92 in the pair of depressions 92 may be tapered, narrowing in the longitudinal direction. Thus, the pair of depressions 92 may help to align nested brake cover apparatuses 20 during stacking because the depressions 92 of adjacent brake cover apparatuses 20 in the stack 64 (FIG. 8) can be configured to nest with each other. It should be appreciated that while a pair of depressions 92 is described herein and illustrated in the figures, any number of depressions 92 could be utilized where at least one depression 92 engages a like-shaped contour 94 of the brake caliper 26.

Figure 5:
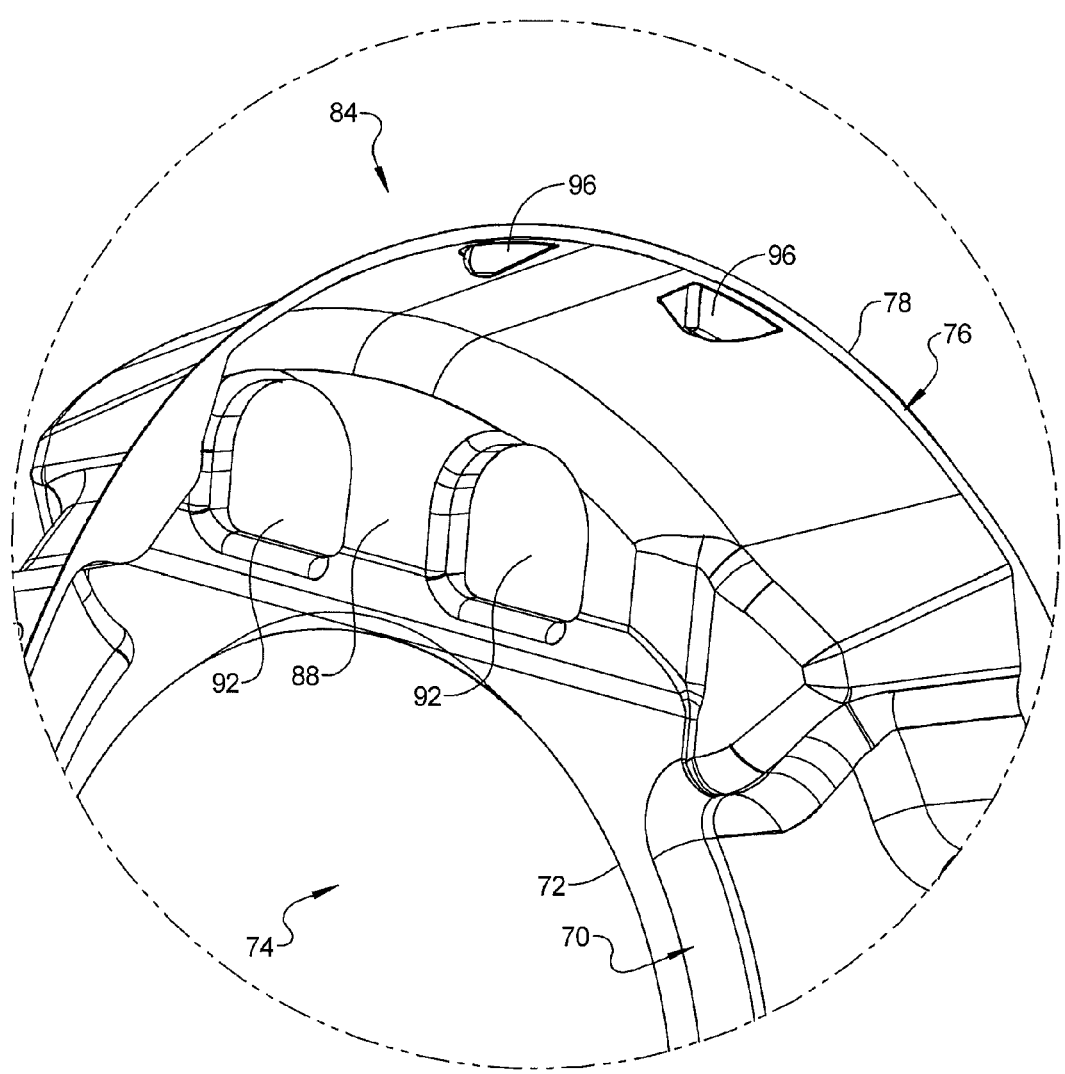
FIG. 5 is an enlarged front perspective view of a portion of the exemplary brake cover apparatus shown in FIG. 2.

With additional reference to FIG. 5, a pair of engagement fingers 96 project radially inwardly from the inner surface 66 of the circumferential wall 60 at the brake caliper pocket 84. The pair of engagement fingers 96 extends into the brake caliper receiving cavity 86 and engage the brake caliper 26 with an audible and/or tactile indicator or snap defining a fully installed position of the brake cover apparatus 20. Advantageously, this audible and/or tactile indicator or snap provides positive feedback to the installer that the brake cover apparatus 20 has been properly installed and that the pair of engagement fingers 96 have engaged the brake caliper 26. While various shapes may be utilized, each engagement finger 96 of the pair of engagement fingers 96 may generally have a wedge shape that gradually slopes radially inwardly from the circumferential wall 60 with increasing depth moving longitudinally from the outer lip 76 toward the sidewall 50. In other words, the pair of engagement fingers 96 have a greater depth relative to the circumferential wall 60 nearer the sidewall 50 and a lesser depth relative to the circumferential wall 60 nearer the outer lip 76. In accordance with this shape, the pair of engagement fingers 96 easily slide over the brake caliper 26 until they snap radially inwardly into place behind the brake caliper 26 or in the gap 36 formed in the brake caliper 26 adjacent the brake rotor 24. It should be appreciated that while a pair of engagement fingers 96 is described herein and illustrated in the figures, any number of engagement fingers 96 could be utilized where at least one engagement finger 96 engages the brake caliper 26 with an audible and/or tactile indicator or snap.

Figure 6:
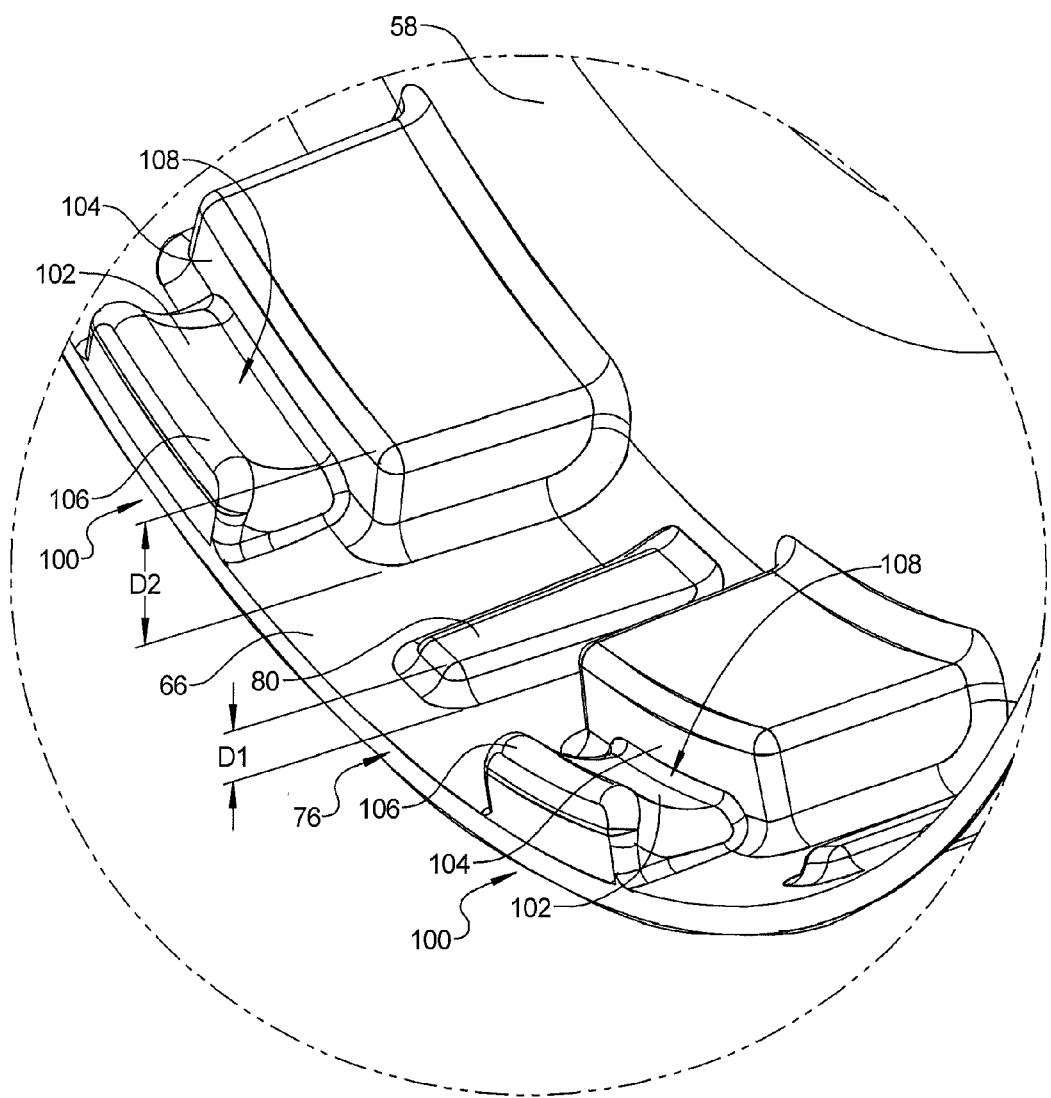
FIG. 6 is an enlarged rear perspective view of a portion of the exemplary brake cover apparatus shown in FIG. 3.

As best seen in FIGS. 2, 3 and 6, a pair of alignment recesses 98 is provided on either side of the brake caliper pocket 84. As such, the alignment recesses 98 are circumferentially spaced by the brake caliper pocket 84. Each alignment recess 98 of the pair of alignment recesses 98 projects radially inwardly from the inner surface 66 of the circumferential wall 60. The pair of alignment recesses 98 straddles the brake caliper 26 and therefore resists rotation of the brake cover apparatus 20 relative to the brake caliper 26. Each alignment recess 98 in the pair of alignment recesses 98 may be tapered, narrowing in the longitudinal direction, as the alignment recess 98 extends longitudinally toward the outer lip 76. Accordingly, the pair of alignment recesses 98 may function to align nested brake cover apparatuses 20 during stacking because the alignment recesses 98 of adjacent brake cover apparatuses 20 nest with each other.

Referring specifically to FIG. 6, a pair of locking recesses 100 project radially inwardly from the inner surface 66 of the circumferential wall 60. The locking recesses 100 are circumferentially spaced from one another and may be spaced by one or more ribs 80 of the plurality of ribs 80. Further, the pair of locking recesses 100 may be disposed along the circumferential wall 60 at circumferential position opposite the brake caliper pocket 84. Each locking recess 100 of the pair of locking recesses 100 projects radially inwardly from the inner surface 66 of the circumferential wall 60 at a second depth D2. The second depth D2 of the pair of locking recesses 100 is greater than the first depth D1 of the plurality of ribs 80 such that the pair of locking recesses 100 extends further into the brake rotor receiving cavity 62 (FIG. 3) than the plurality of ribs 80. In some configurations, the pair of alignment recesses 98 may extend into the brake rotor receiving cavity 62 the same distance or depth as the pair of locking recesses 100 such that both the pair of alignment recesses 98 and the pair of locking recesses 100 extend further into the brake rotor receiving cavity 62 than the plurality of ribs 80.

Figure 8:
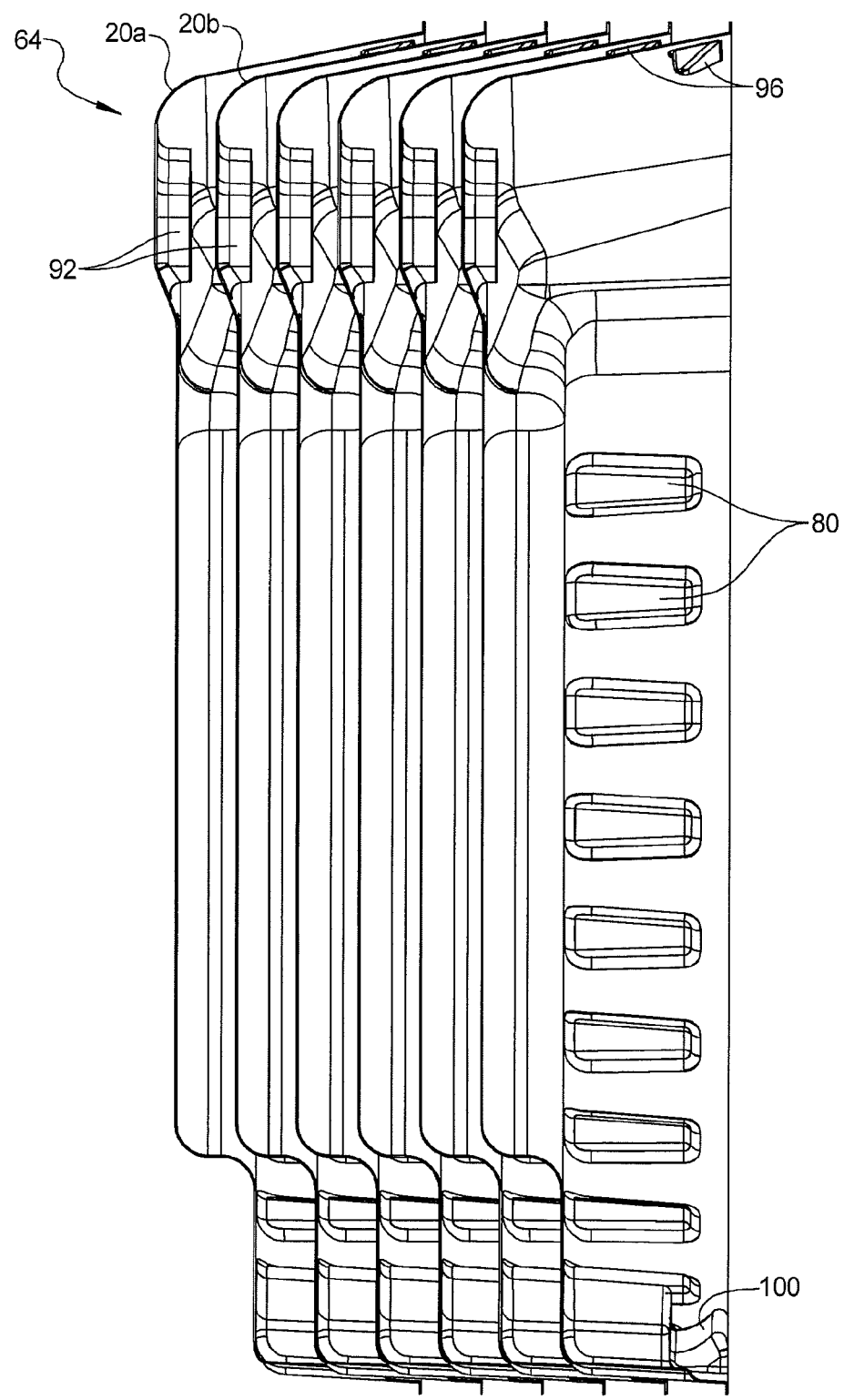
FIG. 8 is a side cross-sectional view of a stack of multiple exemplary brake covers apparatuses constructed in accordance with the subject disclosure.

Each locking recess 100 of the pair of locking recesses 100 includes a locking ramp 102 and a step 104. The locking ramp 102 progressively extends radially inwardly from the inner surface 66 of the circumferential wall 60 into the brake rotor receiving cavity 62 (FIG. 3), moving longitudinally away from the sidewall 50, to form at least one locking tab 106 adjacent the outer lip 76. The step 104 is longitudinally positioned between the locking ramp 102 and the sidewall 50 and projects radially inwardly into the brake rotor receiving cavity 62 (FIG. 3). The locking tab 106 engages the brake dust shield 28 such that the brake dust shield 28 is retained in a channel 108, which in FIG. 6 is created along the locking ramp 102 and between the locking tab 106 and the step 104. The pair of locking recesses 100 may also help retain multiple ones of brake cover apparatuses 20 together as part of a stack 64 (FIG. 8) because the locking recesses 100 interlock with the locking recesses 100 of adjacent brake cover apparatuses 20 in the stack 64 (FIG. 8). Accordingly, the locking recesses 100 resist relative rotation between the multiple brake cover apparatuses 20 in the stack 64. It should be appreciated that while a pair of locking recesses 100 is described herein and illustrated in the figures, any number of locking recesses 100 could be utilized where at least one locking recess 100 engages the brake dust shield 28.

Figure 7:
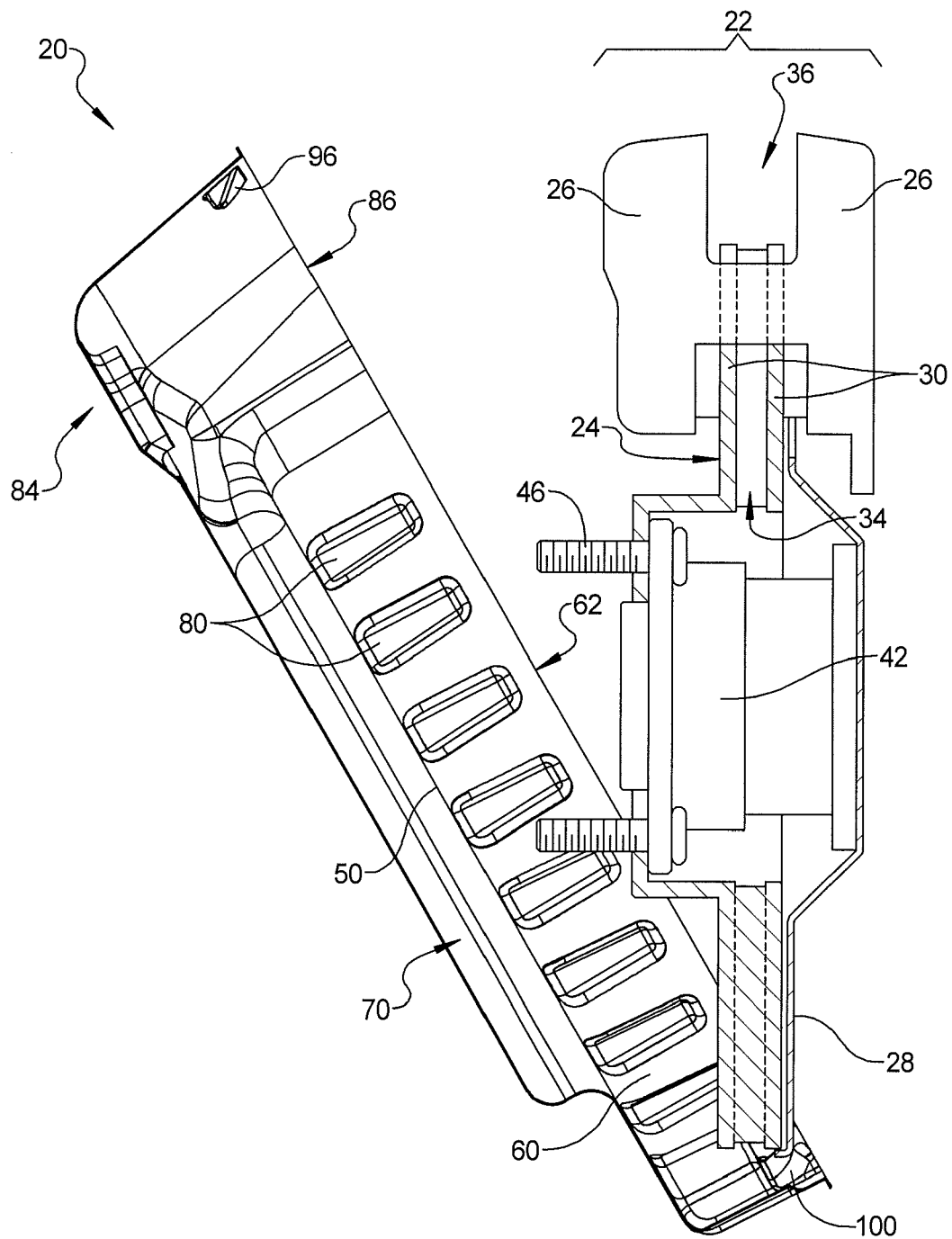
FIG. 7 is a side cross-sectional view of the exemplary brake cover apparatus shown in FIG. 1 being installed on the exemplary brake system also shown in FIG. 1.

With additional reference to FIG. 7, an exemplary process for installing the brake cover apparatus 20 is illustrated. The brake cover apparatus 20 is visually aligned with and positioned over the brake system 22 using at least the brake caliper 26 of the brake system 22 and the brake caliper pocket 84 of the brake cover apparatus 20 as reference points for proper alignment. The brake cover apparatus 20 is tilted longitudinally with respect to the brake system 22 such that the pair of locking recesses 100 engages the brake dust shield 28. Accordingly, the brake dust shield 28 is positioned in the channel 108 disposed between the locking tab 106 and the step 104 (FIG. 6) of the locking recesses 100. The brake cover apparatus 20 is rotated about the engaged portion of the brake dust shield 28 such that the pair of engagement fingers 96 slide over the brake caliper 26 until the pair of engagement fingers 96 engage the brake caliper 26 with an audible and/or tactile indicator or snap. Thus, the brake cover apparatus 20 is retained by at least two general attachment locations, one at the brake caliper 26 and another at the brake dust shield 28. Since the brake cover apparatus 20 does not contact the brake rotor 24, the vehicle 38 may be driven and the brake system 22 operates normally when the brake cover apparatus 20 is installed.

Figure 9:
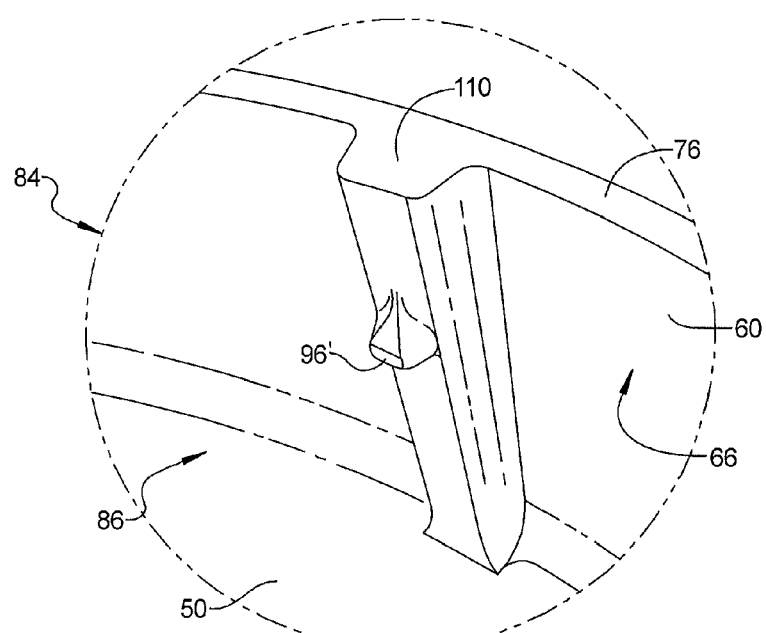
FIG. 9 is an enlarged front perspective view of a portion of another exemplary brake cover apparatus that includes a single engagement finger disposed on an engagement rib.

With additional reference to FIG. 8, multiple brake cover apparatuses 20*a*, 20*b* are shown in a nested stack 64. Several elements including the plurality of ribs 80, the brake caliper pocket 84, the pair of alignment recesses 98, and the pair of depressions 92 of one brake cover apparatus 20*a* nest with the plurality of ribs 80, the brake caliper pocket 84, the pair of alignment recesses 98, and the pair of depressions 92 (FIGS. 2 and 3) of an adjacent brake cover apparatus 20*b* to align the one brake cover apparatus 20*a* with the adjacent brake cover apparatus 20*b*. These elements resist rotation of brake cover apparatus 20*a* relative to the adjacent brake cover apparatus 20*b*. Also, the locking recesses 100 (FIGS. 2 and 3) of brake cover apparatus 20*a* engage/interlock with the locking recesses 100 of the adjacent brake cover apparatus 20*b* to resist relative rotation of the multiple brake cover apparatuses 20*a*, 20*b* and help to hold the stack 64 of multiple brake cover apparatuses 20*a*, 20*b* together. To remove brake cover apparatus 20*a* from the stack 64, the outer lip 76 of brake cover apparatus 20*a* and the outer lip 76 of the adjacent brake cover apparatus 20*b* may be pulled apart longitudinally With reference to FIG. 9, an alternative configuration is shown with a single engagement finger 96'. The single engagement finger 96' is disposed on an engagement rib 110. The engagement rib 110 projects radially inwardly from the inner surface 66 of the circumferential wall 60 at the brake caliper pocket 84 and extends into the brake caliper receiving cavity 86. The single engagement finger 96' extends further into the brake caliper receiving cavity 86 to engage the brake caliper 26 (FIGS. 1 and 7) and is positioned on the engagement rib 110 between the sidewall 50 and the outer lip 76. Like in the configuration illustrated in FIG. 5, the single engagement finger 96' may have a variety of different shapes, including for example, the wedge shape illustrated in FIG. 9.

Figure 10:
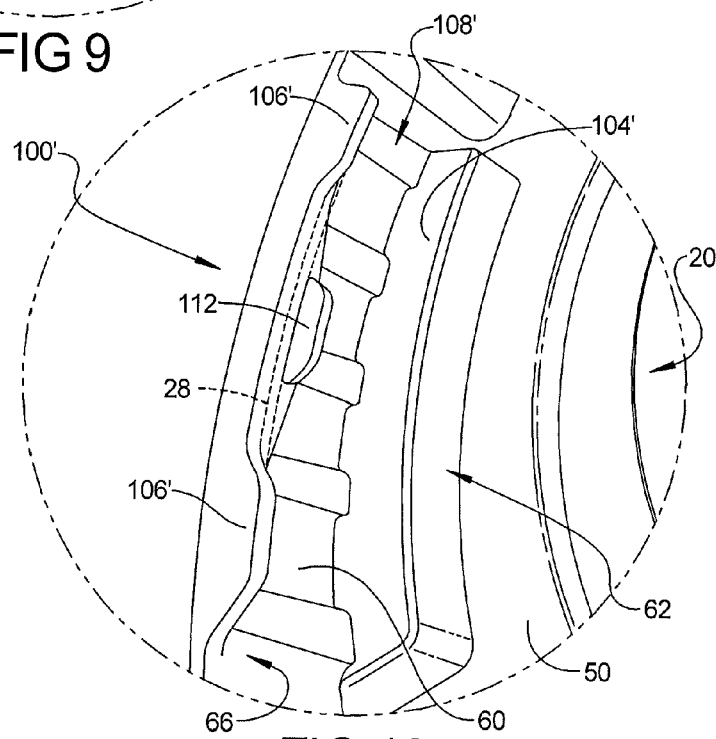
FIG. 10 is an enlarged front perspective view of a portion of another exemplary brake cover apparatus that includes a locking recess with two locking tabs disposed on either side of an abutment tab.

With reference to FIG. 10, an alternative configuration is shown where the one or more locking recesses 100' further include at least one abutment tab 112 that extends radially inwardly into the brake rotor receiving cavity 62 to engage the brake dust shield 28. The abutment tab 112 of the locking recess 100 extends from the inner surface 66 of the circumferential wall 60 and is positioned longitudinally between the locking tabs 106' and the sidewall 50. Although other configurations are possible, the locking tabs 106' of the locking recess 100' shown in FIG. 10 are circumferentially spaced to each side of the abutment tab 112. The abutment tab 112 opposes the locking tabs 106' such that the brake dust shield 28 is received between the abutment tab 112 and the locking tabs 106'. The locking tabs 106' hold the brake cover apparatus 20 in place on the brake dust shield 28 while the abutment tab 112 prevents the brake cover apparatus 20 from being over-inserted during installation on the brake system 22 (FIGS. 1 and 7). In accordance with this configuration, the channel 108' that is formed between the locking recess 100' and the step 104' does not receive the brake dust shield 28 like in the configuration illustrated in FIGS. 6 and 7, but instead receives a portion of the brake rotor 24 (FIGS. 1 and 7). Specifically, the step 104' in FIG. 10 is longitudinally spaced from the abutment tab 112 to define the channel 108' therebetween.

Figure 11:
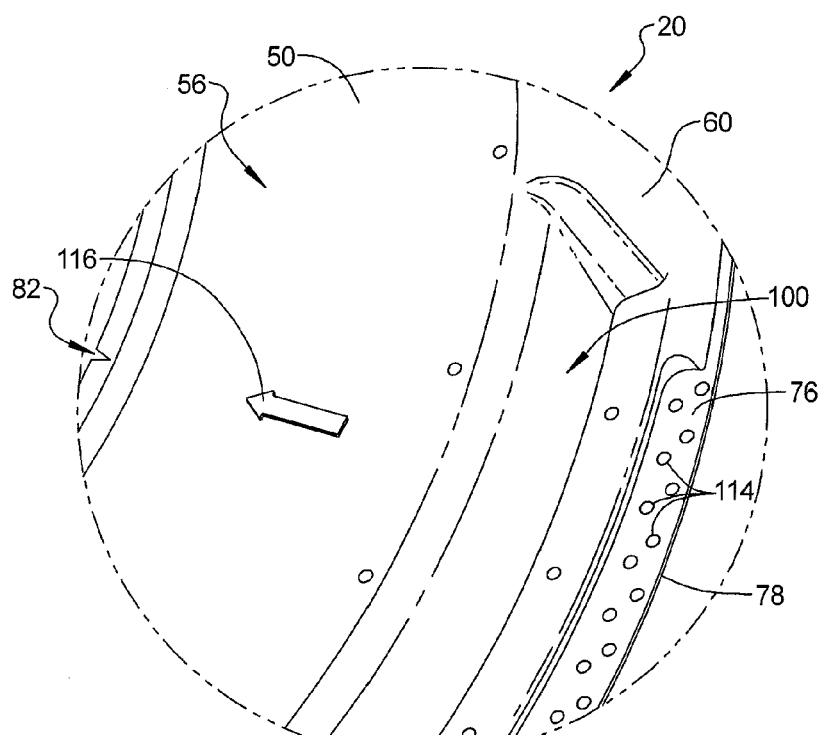
FIG. 11 is an enlarged front perspective view of a portion of another exemplary brake cover apparatus that includes a plurality of raised protrusions projecting from an outer lip.

With reference to FIG. 11, an alternative configuration is shown where a plurality of raised protrusions 114 are disposed on the outer lip 76 between the outermost edge 78 and the circumferential wall 60. The plurality of raised protrusions 114 provide enhanced grip and make it easier for the installer to separate the brake cover apparatus 20 from the nested stack 64 of multiple brake cover apparatuses 20a, 20b (FIG. 8) and then stretch the circumferential wall 60 over the brake system 22 (FIGS. 1 and 7) during installation. To facilitate the ease by which the brake cover apparatus 20 may be removed from the brake system 22 (FIGS. 1 and 7), a plurality of tear element indicators 116 may optionally be provided on the frontal surface 56 of the sidewall 50. The plurality of tear element indicators 116 are radially aligned with the plurality of tear elements 82 to visually identify where the plurality of tear elements 82 are located. In this way, individuals can determine where to begin tearing the brake cover apparatus 20 in order to remove the brake cover apparatus from the brake system 22 (FIGS. 1 and 7). Although various form are possible, the plurality of tear element indicators 116 may be, for example, embossed markings, colored markings, raised markings, engraved markings, or stickers.

Figure 12:
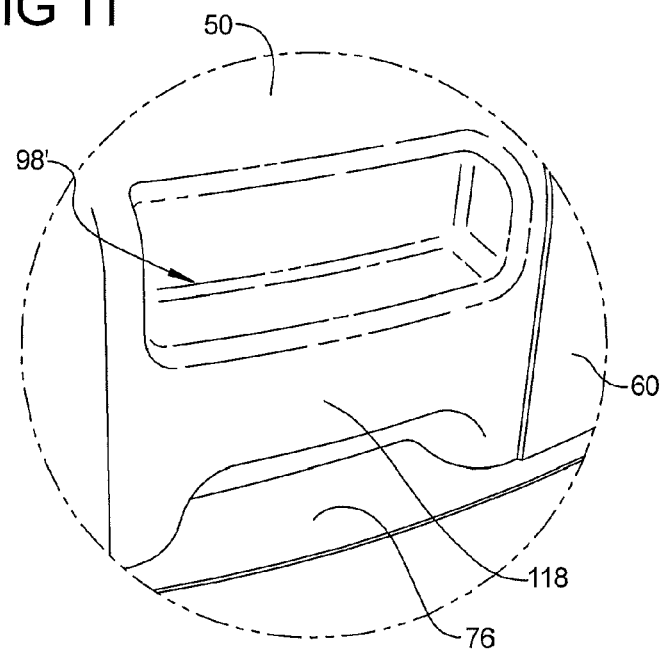
FIG. 12 is an enlarged front perspective view of a portion of another exemplary brake cover apparatus that includes a pair of alignment recesses each having a spacer portion disposed therein.

With reference to FIG. 12, an alternative configuration is shown where each of the alignment recesses 98' includes a spacer portion 118. The spacer portion 118 is disposed in each of the alignment recesses 98' between the sidewall 50 and the outer lip 76. As explained in connection with FIG. 8, multiple brake cover apparatuses 20a, 20b may be stacked with one another. It should be appreciated that the alignment recess 98' illustrated in FIG. 12 is shaped so as to receive the spacer portion 118 of an adjacent brake cover apparatus 20b when the multiple brake cover apparatuses 20a, 20b are arranged in the nested stack 64 shown in FIG. 8. As a result of the abutment of the spacer portion 118 of brake cover apparatus 20a and the spacer portion 118 of the adjacent brake cover apparatus 20b, the outer lip 76 of brake cover apparatus 20a will remain longitudinally spaced from the outer lip 76 of the adjacent brake cover apparatus 20b by a pre-determined distance when the multiple brake cover apparatuses 20a, 20b are arranged in the nested stack 64 shown in FIG. 8. Advantageously, this spacing makes it easier for installers to separate one brake cover apparatus 20a from the nested stack 64.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. For example, the terms "brake rotor", "brake caliper", and "brake dust shield" are not intended to be included in the coverage of the appended claims. While it is envisioned that the brake cover apparatus 20 recited in the claims will be installed over a brake rotor 24, a brake caliper 26, and a brake dust shield 28 to provide these brake system components with temporary protection from the elements, the presence or absence of the brake rotor 24, the brake caliper 26, and the brake dust shield 28 themselves are not intended to be required under the appended claims.

What is claimed is:

1. A brake cover apparatus, comprising:
   a sidewall presenting a frontal surface and a posterior surface opposite said frontal surface;
   a circumferential wall extending transversely from said sidewall to define a brake rotor receiving cavity adjacent said posterior surface of said sidewall, said circumferential wall presenting an inner surface bounding said brake rotor receiving cavity and an outer surface opposite said inner surface;
   a brake caliper pocket disposed along a portion of said sidewall and said circumferential wall that projects from said frontal surface of said sidewall to define a brake caliper receiving cavity adjacent said brake rotor receiving cavity; and
   at least one engagement finger integrally formed with said circumferential wall, said at least one engagement finger projecting radially inwardly from said inner surface of said circumferential wall at said brake caliper pocket, wherein said at least one engagement finger extends into said brake caliper receiving cavity to engage a brake caliper in a fully installed position of said brake cover apparatus and resist separation of said brake cover apparatus from the brake caliper in a direction transverse to said sidewall.

2. The brake cover apparatus as set forth in claim 1, wherein said at least one engagement finger has a wedge shape that gradually slopes radially inwardly from said circumferential wall with increasing depth moving longitudinally toward said sidewall such that said at least one engagement finger provides at least one of an audible indicator and a tactile indicator identifying that said brake cover apparatus has reached said fully installed position.

3. The brake cover apparatus as set forth in claim 1, further comprising:
   at least one locking recess projecting radially inwardly from said inner surface of said circumferential wall, said at least one locking recess including at least one locking ramp that extends into said brake rotor receiving cavity to form at least one locking tab that engages a brake dust shield.

4. The brake cover apparatus as set forth in claim 3, wherein said at least one locking recess includes at least one abutment tab that extends radially inwardly into said brake rotor receiving cavity to engage the brake dust shield, said at least one abutment tab being disposed on said inner surface of said circumferential wall between said at least one locking tab and said sidewall, said at least one abutment tab opposing said at least one locking tab such that the brake dust shield is received between said at least one abutment tab and said at least one locking tab.

5. The brake cover apparatus as set forth in claim 3, wherein said at least one locking recess includes a step that extends inwardly into said brake rotor receiving cavity from said inner surface of said circumferential wall and said sidewall, said step being spaced from said at least one locking tab.

6. The brake cover apparatus as set forth in claim 3, wherein said circumferential wall is shaped such that said brake cover apparatus is capable of nesting with an adjacent brake cover apparatus where said at least one locking recess of said brake cover apparatus is configured to at least partially receive a locking recess of the adjacent brake cover apparatus to resist relative rotation therebetween.

7. The brake cover apparatus as set forth in claim 1, further comprising:
a pair of depressions projecting longitudinally from said brake caliper pocket into said brake caliper receiving cavity that are configured to mate with contours of the brake caliper.

8. The brake cover apparatus as set forth in claim 1, further comprising:
a pair of alignment recesses circumferentially spaced by said brake caliper pocket that project radially inwardly from said inner surface of said circumferential wall to contact opposite sides of the brake caliper.

9. The brake cover apparatus as set forth in claim 1, further comprising:
an annular projection extending longitudinally from said frontal surface of said sidewall that defines a central opening of circular shape.

10. The brake cover apparatus as set forth in claim 1, further comprising:
an outer lip extending radially outwardly from said circumferential wall that is longitudinally spaced from said sidewall by said circumferential wall to form an outermost edge that circumscribes said outer lip.

11. The brake cover apparatus as set forth in claim 10, further comprising:
a plurality of raised protrusions disposed on said outer lip between said outermost edge and said circumferential wall for providing enhanced grip.

12. The brake cover apparatus as set forth in claim 1, further comprising:
a plurality of ribs circumferentially spaced about said circumferential wall that project radially inwardly from said inner surface of said circumferential wall.

13. The brake cover apparatus as set forth in claim 1, further comprising:
a plurality of tear elements circumferentially spaced about said sidewall that allow said brake cover apparatus to be removed by tearing along said tear elements.

14. The brake cover apparatus as set forth in claim 13, further comprising:
a plurality of tear element indicators disposed on said frontal surface of said sidewall that are radially aligned with said plurality of tear elements to visually identify where said plurality of tear elements are located.

15. The brake cover apparatus as set forth in claim 1, further comprising:
an engagement rib projecting radially inwardly from said inner surface of said circumferential wall at said brake caliper pocket that extends into said brake caliper receiving cavity, said at least one engagement finger being disposed on and extending from said engagement rib.

16. A brake cover apparatus for protecting a brake system including a brake rotor, a brake caliper, and a brake dust shield, said brake cover apparatus comprising:

a sidewall presenting a frontal surface and a posterior surface opposite said frontal surface;

a circumferential wall extending transversely from said sidewall to define a brake rotor receiving cavity adjacent said posterior surface of said sidewall, said circumferential wall presenting an inner surface bounding said brake rotor receiving cavity and an outer surface opposite said inner surface;

a brake caliper pocket disposed along a portion of said sidewall and said circumferential wall that projects from said frontal surface of said sidewall to define a brake caliper receiving cavity adjacent said brake rotor receiving cavity;

at least one locking recess projecting radially inwardly from said inner surface of said circumferential wall, said at least one locking recess including a locking ramp that extends into said brake rotor receiving cavity to engage the brake dust shield; and at least one engagement finger projecting radially inwardly from said inner surface of said circumferential wall at said brake caliper pocket that extends into said brake caliper receiving cavity to engage the brake caliper and define a fully installed position of said brake cover apparatus, said at least one engagement finger having a wedge shape that gradually slopes radially inwardly from said circumferential wall with increasing depth moving longitudinally toward said sidewall such that said at least one engagement finger resists separation of said brake cover apparatus from the brake caliper in a direction transverse to said sidewall and causes said circumferential wall to deflect radially outwardly at first, away from an initial orientation, and then retract back towards said initial orientation as said brake cover apparatus is moved towards said fully installed position to provide at least one of an audible indicator and a tactile indicator identifying that said brake cover apparatus has reached said fully installed position.

17. The brake cover apparatus as set forth in claim 16, wherein said circumferential wall is shaped to nest with an adjacent brake cover apparatus where said at least one locking recess at least partially receives a locking recess of the adjacent brake cover apparatus to resist relative rotation therebetween.

18. The brake cover apparatus as set forth in claim 16, wherein said at least one locking recess is a pair of locking recesses that are circumferentially spaced from one another and from said brake caliper pocket.

19. A brake cover apparatus for protecting a brake system including a brake rotor, a brake caliper, and a brake dust shield adjacent the brake rotor, said brake cover apparatus comprising:

a sidewall having a circular, disc shape extending radially between an inner edge and an outer edge that is concentric with and spaced radially outwardly from said inner edge, said sidewall presenting a frontal surface and a posterior surface that is opposite said frontal surface;

a circumferential wall having a cylindrical shape extending transversely from said outer edge of said sidewall to define a brake rotor receiving cavity adjacent said posterior surface of said sidewall, said circumferential wall presenting an inner surface circumferentially bounding said brake rotor receiving cavity and an outer surface that is opposite said inner surface;

an annular projection extending longitudinally from said frontal surface of said sidewall and radially inwardly from said inner edge of said sidewall to form an innermost edge that defines a central opening of circular shape;

an outer lip extending radially outwardly from said circumferential wall that is longitudinally spaced from said sidewall by said circumferential wall to form an outermost edge that circumscribes said outer lip;

a brake caliper pocket disposed along said sidewall and said circumferential wall having a semi-circular shape and a limited circumferential extent that projects longitudinally from said frontal surface of said sidewall to define a brake caliper receiving cavity adjacent said brake rotor receiving cavity, said brake caliper pocket presenting a front surface and a back surface opposite said front surface that abuts said brake caliper receiving cavity;

a plurality of ribs circumferentially spaced about said circumferential wall that project radially inwardly from said inner surface of said circumferential wall at a first depth;

a plurality of tear elements circumferentially spaced about said innermost edge of said annular projection that allow said brake cover apparatus to be removed by tearing along said tear elements;

at least one engagement finger integrally formed with said circumferential wall, said at least one engagement finger projecting radially inwardly from said inner surface of said circumferential wall at said brake caliper pocket, wherein said at least one engagement finger extends into said brake caliper receiving cavity to engage the brake caliper and resist separation of said brake cover apparatus from the brake caliper in a direction transverse to said sidewall;

a pair of alignment recesses circumferentially spaced by said brake caliper pocket that project radially inwardly from said inner surface of said circumferential wall; and a pair of locking recesses circumferentially spaced from one another at circumferential positions opposite said brake caliper pocket that project radially inwardly from said inner surface of said circumferential wall at a second depth that is greater than said first depth to contact the brake dust shield opposite the brake caliper, said pair of locking recesses each including a locking ramp that progressively extends radially inwardly from said inner surface of said circumferential wall into said brake rotor receiving cavity to form at least one locking tab adjacent said outer lip that engages the brake dust shield.

20. The brake cover apparatus as set forth in claim 19, wherein said circumferential wall is tapered to nest with an adjacent brake cover apparatus and wherein said pair of alignment recesses each include a spacer portion disposed therein between said sidewall and said outer lip, said pair of alignment recesses receiving spacer portions of the adjacent brake cover apparatus in a nested arrangement such that said outer lip is spaced from an outer lip of the adjacent brake cover apparatus.

* * * * *